April 6, 1965    C. E. McKEON    3,176,803
MECHANICAL EQUALIZER FOR TRACTOR BRAKES
Filed April 29, 1963    2 Sheets-Sheet 1
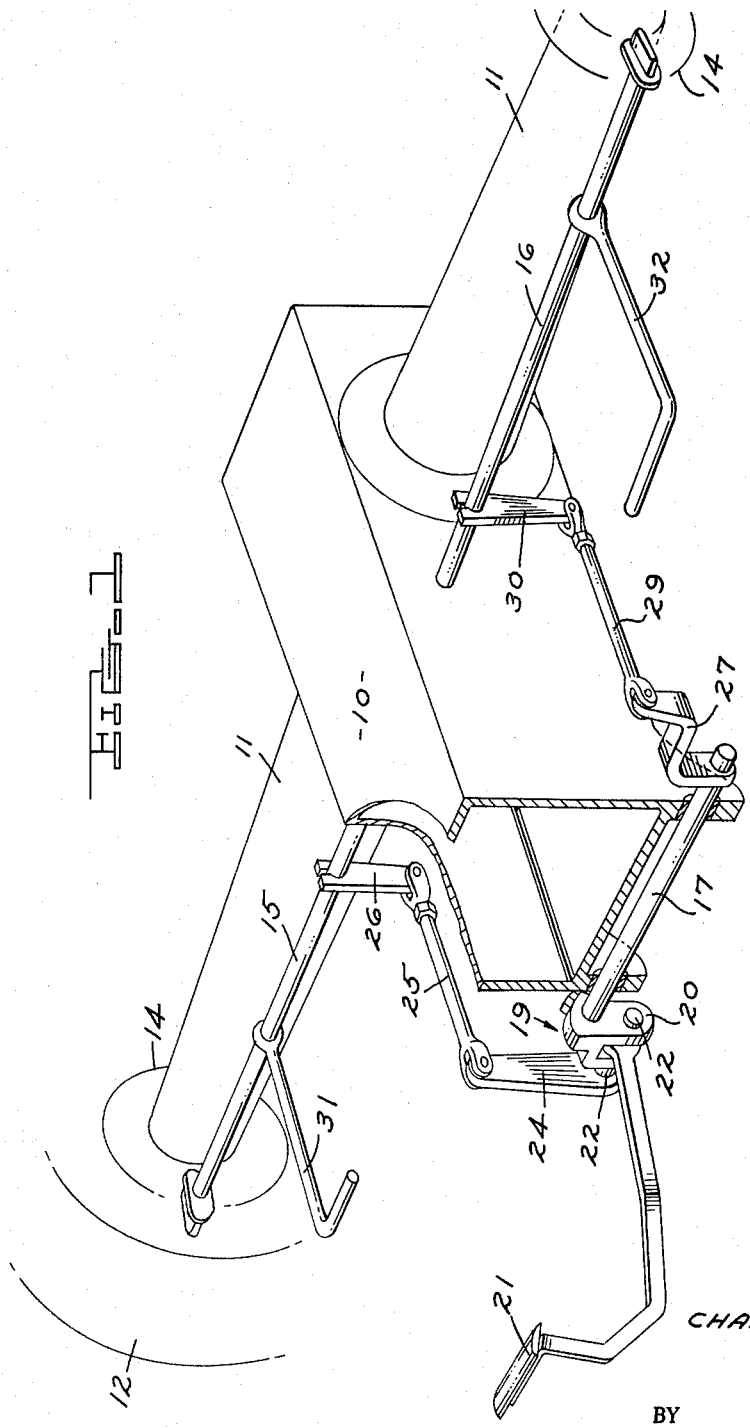
CHARLES E. McKEON
INVENTOR.
BY
P. F. Hilder
ATTORNEY April 6, 1965   C. E. McKEON   3,176,803
MECHANICAL EQUALIZER FOR TRACTOR BRAKES
Filed April 29, 1963   2 Sheets-Sheet 2
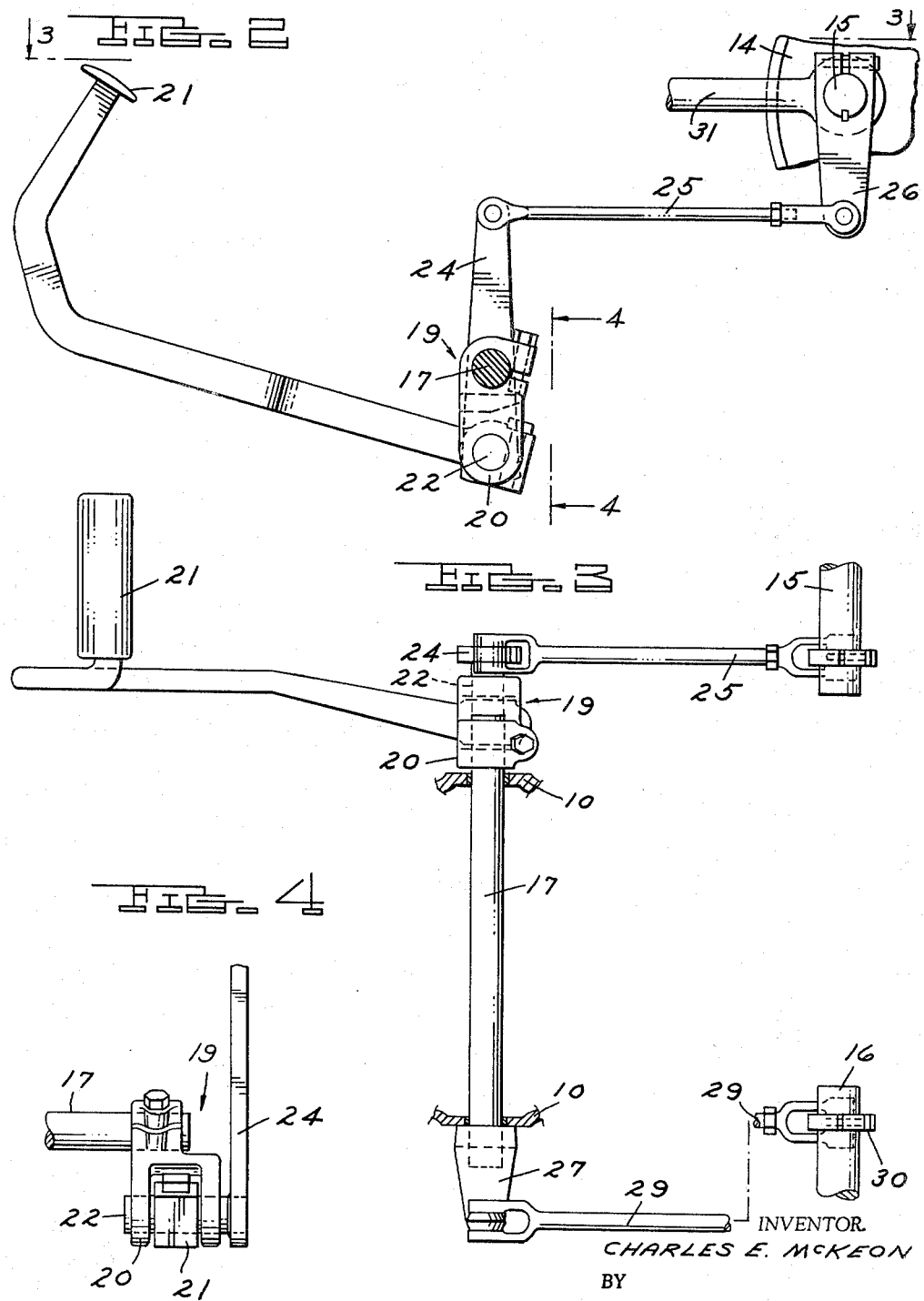
INVENTOR.
CHARLES E. McKEON
BY
P. F. Hilder
ATTORNEY

3,176,803
MECHANICAL EQUALIZER FOR TRACTOR BRAKES
Charles E. McKeon, Birmingham, Mich., assignor to Ford Motor Company, Dearborn, Mich., a corporation of Delaware
Filed Apr. 29, 1963, Ser. No. 276,495
6 Claims. (Cl. 188—204)

This invention relates to brakes for tractors, and more particularly to brake linkage for equalizing the braking effort applied to a pair of tractor wheels.

Off-highway tractors conventionally are provided with brakes which may be independently applied to steer the tractor by braking in addition to steering by the customary steerable front wheels. Frequently, a separate pedal is provided for each wheel. At times, however, it is desirable to apply both brakes simultaneously, and in certain models of tractors to provide only for equalized simultaneous operation of the brakes of both rear wheels from a single pedal.

Tractor brakes usually are mechanically actuated and operate on the rear wheels only. The brake shoes, which are adjacent the wheels, are actuated by rotating a pair of brake shafts which often extend one along the forward side of each rear axle housing.

According to the present invention, a single brake pedal is linked by a series of levers to operate each brake shaft with equal force. In addition, individual pedals may be connected with each brake operating shaft to operate it independently of the other.

Among the objects of the present invention are to provide an improved linkage for operating brakes on both rear wheels of a tractor from a single pedal; to provide such a linkage which provides equalization of braking effort to both rear wheels; to provide such a linkage in which the brakes also may be operated independently by separate pedals; and generally to improve brake operating linkages of the type described.

Other objects, and the nature and scope of the invention will be more apparent from the detailed description to follow.

FIGURE 1 is a somewhat diagrammatic, isometric view showing portions of the center housing and rear axle housing of a tractor and showing the brake system of the present invention applied thereto, portions of the housing having been broken away for convenience of illustration.

FIGURE 2 is a side elevation of the brake pedal and associated linkage for operating on the brakes.

FIGURE 3 is a top plan view of the pedal and brake operating linkage, portions of the center housing being indicated.

FIGURE 4 is a detailed view of the brake pedal and associated parts as indicated by line 4—4 of FIGURE 2.

Referring to the drawings, the tractor upon which the brake operating mechanism of the present invention is incorporated is the well-known Ford tractor having a center housing 10 extending longitudinally of the tractor. A pair of trumpets or rear axle housing portions 11 are bolted to the sides of the center housing and support the rear axle shaft, not shown, and rear wheels, one wheel 12 being shown.

A brake, not shown, which may be of conventional construction, is applied to each wheel, the brakes being carried by backing plates, the right backing plate 14 being shown. The brakes are mechanically actuated by brake-operating shafts 15 and 16 which preferably extend between the center housing 10 and backing plates 14 and immediately in front of and generally parallel to the axle housing 11. The operating shafts 15 and 16 may be journaled in the center housing and backing plates. This construction is more or less conventional.

According to the present invention, an automatically equalizing brake operating linkage is provided for operating both brakes simultaneously from a single pedal while applying equal braking effort to each of the rear wheels. This mechanism includes a cross-shaft 17 extending transversely through a portion of the center housing and rotatably supported thereby.

A radially projecting arm 19 is fixed to one end of the cross-shaft 17 for rotation therewith and preferably is provided with a bifurcated lower end 20. A brake pedal 21 has its lower end received within the bifurcated end 20 of the arm 19 and is fixed to a short shaft 22 rotatably mounted within the arm 19 for rotation about an axis parallel to the axis of the cross-shaft. A lever 24 is fixed to the shaft 22 and is connected by a brake rod 25 with a lever 26 fixed to the brake operating shaft 15.

On the other side of the center housing 10, a lever 27 fixed to the cross-shaft 17 is connected by a brake rod 29 with a lever 30 fixed to the other brake operating shaft 16.

Upon pressing the pedal 21 downwardly, torque is applied to rotate the cross-shaft counter-clockwise as viewed from the left side of the tractor and acting through the lever 27, brake rod 29 and lever 30, torque is applied to the brake operating shaft 16. At the same time, operation of the pedal also applies torque to the shaft 22 to which the brake pedal is fixed, which, acting through lever 24, brake rod 25 and lever 26, rotates the brake operating shaft 15 clockwise as viewed from the left of the tractor.

By adjusting the lengths of the various levers, equal torque may be applied from the pedal 21 to each of the brake operating shafts 15 and 16 so as to apply equal braking to each of the tractor wheels. In addition, right and left individual brake-operating pedals 31 and 32 may be fixed directly to the brake operating shafts 15 and 16 to selectively operate either brake to aid in steering the tractor. Rotation of the brake operating shafts 15 and 16 in either direction will apply the brakes. Selective operation of either brake by means of the pedals 31 or 32 may move the brake pedal 21 slightly but will not result in operation of the opposite brake.

I claim:
1. An equalizing brake linkage for a pair of brake operating shafts extending longitudinally of a rear axle housing and journaled for rotation, said linkage comprising a cross-shaft journaled for oscillation on a fixed axis, a first radially projecting arm fixed to the cross-shaft, a brake pedal mounted on said first arm for oscillation on an axis parallel to the axis of the cross-shaft, a first lever mounted for oscillation with and about the axis of the brake pedal, means connecting said first lever with one of the brake operating shafts, a second lever fixed to the cross-shaft, and means connecting said second lever with the other brake operating shaft.

2. An equalizing brake linkage for a pair of brake operating shafts extending longitudinally of a rear axle housing and journaled for rotation, said linkage comprising a cross-shaft journaled for oscillation on a fixed axis, a first radially projecting arm fixed to the cross shaft, a brake pedal pivotally mounted on said first arm for oscillation on an axis parallel to the axis of the cross-shaft, a first lever mounted for oscillation with and about the axis of the brake pedal, means connecting said first lever with one of the brake operating shafts, a second lever fixed to the cross-shaft, means connecting said second lever with the other brake operating shaft, and an individual brake pedal connected directly to each brake operating shaft.

3. An equalizing brake linkage for a pair of brake operating shafts extending longitudinally of a rear axle housing and journaled for rotation, said linkage comprising a cross-shaft journaled for oscillation on a fixed axis, a first radially projecting arm fixed to the cross-shaft, a brake pedal pivotally mounted on said first arm for oscillation on an axis parallel to the axis of the cross-shaft, a first lever mounted for oscillation with and about the axis of the brake pedal, means connecting said first lever with one of the brake operating shafts, a second lever fixed to the cross-shaft, and means connecting said second lever with the other brake operating shaft.

4. An equalizing brake linkage for a pair of brake operating shafts extending longitudinally of a rear axle housing and journaled for rotation, said linkage comprising a cross-shaft journaled for oscillation on a fixed axis, a first radially projecting arm fixed to the cross-shaft, a brake pedal mounted on said first arm for oscillation on an axis parallel to the axis of the cross-shaft, a first lever mounted for oscillation with and about the axis of the brake pedal, means connecting said first lever with one of the brake operating shafts, a second lever fixed to the cross-shaft, and means connecting said second lever with the other brake operating shaft, reaction of the braking effort applied to the first lever causing displacement of the axis of the brake pedal to apply equal braking effort to the second lever.

5. An equalizing brake linkage for a pair of brake operating shafts extending longitudinally of a rear axle housing and journaled for rotation, said linkage comprising a cross-shaft journaled for oscillation on a fixed axis, a first radially projecting arm fixed to the cross-shaft and having a bifurcated outer end, a brake pedal pivotally mounted within the bifurcated end of said first arm for oscillation on an axis parallel to the axis of the cross-shaft, a first lever mounted for oscillation with and about the axis of the brake pedal, means connecting said first lever with one of the brake operating shafts, a second lever fixed to the cross-shaft, and means connecting said second lever with the other brake operating shaft.

6. An equalizing brake linkage for a pair of brake operating shafts extending longitudinally of a rear axle housing and journaled for rotation, said linkage comprising a cross-shaft journaled for oscillation on a fixed axis, a first radially projecting arm fixed to the cross-shaft and having a bifurcated outer end, a brake pedal pivotally mounted within the bifurcated end of said first arm for oscillation on an axis parallel to the axis of the cross-shaft, a first lever mounted for oscillation with and about the axis of the brake pedal, means connecting said first lever with one of the brake operating shafts, a second lever fixed to the cross-shaft, and means connecting said second lever with the other brake operating shaft, reaction of the braking effort applied to the first lever causing displacement of the axis of the brake pedal to apply equal braking effort to the second lever.

References Cited by the Examiner
UNITED STATES PATENTS

| | | | |
|---|---|---|---|
| 1,945,891 | 2/34 | Girling | 188—204 |
| 2,790,522 | 4/57 | Senkowski et al. | 188—204 |

ARTHUR L. LA POINT, *Primary Examiner.*

DUANE A. REGER, *Examiner.*